United States Patent [19]

Fortuin et al.

[11] Patent Number: 5,503,791
[45] Date of Patent: Apr. 2, 1996

[54] MICROPOROUS FILM OF POLYETHYLENE AND PROCESS FOR THE PRODUCTION THEREOF

[75] Inventors: Henricus M. Fortuin, Maastricht; Joseph A. P. M. Simmelink, Eijsden, both of Netherlands

[73] Assignee: DSM N.V., Heerlen, Netherlands

[21] Appl. No.: 299,062

[22] Filed: Aug. 31, 1994

Related U.S. Application Data

[62] Division of Ser. No. 89,612, Jul. 12, 1993, Pat. No. 5,376,445, which is a continuation of Ser. No. 836,371, Feb. 18, 1992, abandoned.

[30] Foreign Application Priority Data

Feb. 18, 1991 [NL] Netherlands ............... 9100279

[51] Int. Cl.$^6$ ............................................. D01D 5/12
[52] U.S. Cl. .................. 264/210.3; 264/211.13; 264/216; 264/288.4; 264/290.2; 526/352
[58] Field of Search ............... 264/216, 288.4, 264/290.2, 210.3, 211.13; 526/352

[56] References Cited

U.S. PATENT DOCUMENTS

| | | | |
|---|---|---|---|
| 4,613,544 | 9/1986 | Burleigh . | |
| 4,620,955 | 11/1986 | Kono et al. | 264/41 |
| 4,829,096 | 5/1989 | Kitamura et al. . | |
| 4,833,172 | 5/1989 | Schwarz et al. . | |
| 4,873,034 | 10/1989 | Kono et al. | 264/41 |
| 4,948,544 | 8/1990 | Van Unen et al. . | |
| 4,987,025 | 1/1991 | Shiraki et al. . | |
| 5,051,183 | 9/1991 | Takita et al. | 210/500.36 |

FOREIGN PATENT DOCUMENTS 378279 7/1990 European Pat. Off. .

*Primary Examiner*—David W. Wu
*Attorney, Agent, or Firm*—Cushman Darby & Cushman

[57] ABSTRACT

Microporous film of polyethylene with a high degree of moisture vapour transmission rate and permeability to air and a process for the production of such a film from a polyolefine by extruding a solution of the polyolefine in a first solvent, followed by cooling, the removal of the solvent and stretching of the film, in which both sides of the film are brought into close contact with a second solvent for the polyolefine before the film is contacted with the cooling agent.

7 Claims, No Drawings

MICROPOROUS FILM OF POLYETHYLENE AND PROCESS FOR THE PRODUCTION THEREOF

RELATED APPLICATIONS

This is a divisional application of U.S. application Ser. No. 08/089,612, filed Jul. 12, 1993, now U.S. Pat. No. 5,376,445, which was a continuation of U.S. application Ser. No. 07/836,371, filed Feb. 18, 1992 (now abandoned).

FIELD AND BACKGROUND OF THE INVENTION

The invention relates to a microporous film of polyethylene.

Such a film is known from EP-A-378 279, which describes a process for the production of microporous films from a solution of ultra high molecular weight polyethylene in an evaporable solvent.

This film presents the drawback that it is has a limited permeability to gases such as air, which limits in particular the use of the film for air filtration purposes.

The aim of the invention is to provide a microporous film of polyethylene with an improved permeability to air relative to that of the known film.

This aim is achieved according to the invention because the film has a permeability to air of less than 10 s/50 ml and a moisture vapour transmission rate of at least 7500 g/24 h.m$^2$.

The film according to the invention has a very great capability of transmitting gases such as air, already at a small difference in pressure across the film. When the film is used as a filtering medium a high yield of purified gas per time unit can be obtained. The permeability to air of the film according to the invention is better than 10 s/50 ml, preferably better than 7 s/50 ml. For a good understanding it should be noted here that the time that is required to transport a certain amount of air through the film is used as a measure of the permeability to air and that a smaller number of seconds hence corresponds to a better permeability to air.

A further added advantage of the film according to the invention is its very high moisture vapour transmission ratio, which is at least 7500 g/24h.m$^2$ preferably at least 10,000 g/24h.m$^2$.

The resistance of the film to a difference in pressure as occurs in filtration applications depends on the thickness of the film. Films according to the invention with a thickness of 10 μm already appear to be strong enough for many applications. Preferably the thickness of the film according to the invention is at least 10 μm.

Another advantage of the film according to the invention is its high abrasion resistance and its high degree of resistance to chemicals, which also make the film suitable for filtration in acid and basic media.

The film according to the invention is microporous and consists substantially of polyethylene. A microporous film consists of an essentially continuous matrix structure containing small pores or channels. The size of these pores and channels is between 0.001 and 10 μm, preferably between 0.01 and 5 μm.

Polyethylene is here understood to be linear polyethylene with fewer than 1 side chain per 100 carbon atoms, preferably fewer than 1 side chain per 300 carbon atoms, and a polyethylene of that kind that may also contain minor amounts, preferably less than 5 mol. % of one or more copolymerised other alkenes, for example propylene, butylene, pentene, hexene, 4-methylpentene, octene, etc. Such polyethylene can be produced for example with the aid of a Ziegler or a Phillips process using suitable catalysts under known polymerisation conditions. The polyethylene may also contain minor amounts, for example at most 25 wt. %, of one or more other polymers, in particular an alkene-1-polymer, such as polypropylene, polybutylene or a copolymer of propylene with a minor amount of ethylene. The polyethylene may contain the usual additives, such as stabilizers, colourants, pigments, fillers and the like. The weight average molecular weight of polyethylene is determined with the aid of the known methods such as Gel Permeation Chromatography and Light Diffusion or is calculated from the Intrinsic Viscosity (IV), determined in Decalin at 135° C. A weight average molecular weight of, for example, 0.5×10$^6$ g/mol corresponds to an IV, determined in Decalin at 135° C., of 5.1 dl/g according to the empirical equation $$M_w = 5.37 \times 10^4 \, [IV]^{1.37}.$$

Because polyethylene with a high or a very high molecular weight has special properties, such as a high abrasion resistance and a high resistance to many chemicals, use is preferably made of ultra high molecular weight polyethylene, UHMWPE. Such UHMWPE has a molecular weight of at least 5×10$^5$ g/mol, preferably at least 10$^6$ g/mol.

The invention also relates to a process for the production of a microporous film from a polyolefin by forming a solution thereof in an evaporable, first solvent into a film, passing the film through a bath containing a cooling agent and evaporating the solvent from the film at a temperature below the dissolution temperature and stretching the film in one or more directions in the plane of the film, wherein the film can have a thickness upwardly from about 10 μm. The film can be 140, 150 or 210 μm thick.

Such a process is also known from EP-A-378 279 for the production of microporous films, in which UHMWPE is used as the polyolefin, wherein Examples 11, 12 and 13 therein report respectively a film having a thickness of 210 μm, 150 μm and 140 μm.

A drawback of this known process is that the films to be produced therewith appear to have a moderate permeability to air.

The aim of the invention is to provide a process for the production of microporous films from a polyolefin with a very high permeability to air.

This aim is achieved according to the invention because both sides of the film are brought into close contact with a second solvent, preferably being a solvent for the polyolefin, before the film is contacted with the cooling agent.

With this process it appears to be possible to produce microporous films with a very high permeability to air of better than 10 s/50 ml. A large proportion, usually on the order of at least 50%, of the solution from which the film is formed, and hence also of the film formed from the solution consists of the first solvent. The proportion consisting of the first solvent is even greater when UHMWPE is used. The same large proportion of the surface consists of this solvent and it is therefore very surprising that a close contact of this surface with a second solvent has such a great effect.

A further advantage of the process according to the invention is that the film obtained therewith has a very high moisture vapour transmission rate, which makes the film suitable for use as, for example, a breathing sandwich layer in clothing.

As evaporable solvents use is made of the known polyolefin solvents such as aliphatic, cycloaliphatic and aromatic hydrocarbons, for example toluene, xylene, Tetralin, Decalin, $C_6$-$C_2$-alkanes or petroleum fractions, but also halogenated hydrocarbons, for example trichlorobenzene and other known solvents. In connection with the removal of the solvent, use is preferably made of solvents whose boiling points at atmospheric pressure are lower than 210° C., which is the case with virtually all of the aforementioned solvents.

As polyolefin use is preferably made of polyethylene or polypropylene or copolymers thereof with at most 5 mol. % of one or more other alkenes. Polyethylene is preferred on account of its greater resistance to many chemicals and its great abrasion resistance. Because in particular polyethylene with a high or a very high molecular weight has these properties, use is preferably made of ultra high molecular weight polyethylen. Such UHMWPE has a molecular weight of at least $5 \times 10^5$ g/mol, preferably of at least $10^6$ g/mol.

Homogeneous solutions should be used to produce films from solutions of a polyolefine. The known methods, for example employing an extruder, can be used for the continuous production of homogeneous solutions of a polyolefin. Using this method presents the advantage that the solution can be prepared and extruded into a film or processed into a film in a different manner in one continuous process. The invention is not limited to such a process though and to a person skilled in the art it will of course be clear that homogeneous solutions prepared in a different manner can also be processed into microporous films.

The concentration of the polyolefin in the solution may vary within wide limits and will usually be chosen between 2 and 50 wt. %, for practical reasons mainly. Solutions containing less than about 2 wt. % polyolefin usually result in films that are so fragile that it is extremely difficult to process them further. On the other hand, solutions containing more than 30 wt. %, in the case of UHMWPE, and, in other cases, in particular more than 50 wt. %, become increasingly difficult to process. Concentrated solutions with polyolefin concentrations of 50 wt. % or more are therefore not preferable although it is possible to use such solutions and the use thereof is hence within the scope of the present invention. If a portion of the polyolefin is cross-linked before it is dissolved, the processability of the solution appears to be better in a few cases than if the solution contains the same total concentration of only non-cross-linked polyolefin. This applies to UHMWPE in particular.

The polyolefin solution is converted into a film that consists of the solution. This can be done in different manners, for example by spinning it via a spinneret with a very wide slit-shaped nozzle, by extruding it or by pouring it onto a roll or a band.

After a polyolefin solution has been processed into a film the film consisting of the solution is passed through a cooling bath containing cooling agent. By preference, a cooling agent is used in which the polyolefin is not soluble. Water is a very suitable cooling agent. The temperature is reduced to such an extent in the cooling process that gelling takes place in the film so that a structure is formed that is sufficiently strong and stable for further processing. It is possible to cool to ambient or an even lower temperature but since the first solvent is to be evaporated from the film in the next process step it will be clear that, for a profitable process, it is very desirable to keep the temperature as high as possible in general. The amount of heat required to remove the solvent from the film is thus limited as much as possible.

The first solvent is removed from the film at a temperature below the dissolution temperature, preferably by evaporation but extraction is also possible. The dissolution temperature is the temperature above which the polyolefine in question can be homogeneously dissolved in the first solvent. If this solution is cooled to below the dissolution temperature gelling will take place. The dissolution temperature and the gelling temperature may differ from one another to a limited extent. In that case, according to the present invention, the first solvent is evaporated from the film at a temperature below the lowest of those temperatures.

If the forming method employed permits it, the film may be prestretched if so desired; this means that the linear rate at which the gelled film is drawn from the bath or transported differs from the linear rate at which the film is formed from the solution. For instance, when extrusion is used, the latter rate is the linear rate at which the solution emerges from the die opening. In the scope of the present patent prestretching is defined as the quotient of the rate at which the film is transported or drawn from the bath, as described above, and the aforementioned rate at which the solution emerges from the die opening.

In the evaporation of the first solvent the film shows a tendency to shrink. In order to obtain a microporous film this shrinkage must be prevented in at least one direction lying in the plane of the film. This can be done in a simple manner by clamping the film. If the film is clamped in two directions, its thickness is the only dimension that can, and in fact does, decrease. Something similar holds for, for example, tubular film and hollow filaments. It is not only possible to prevent shrinkage but even to stretch the film in one or two directions already during the evaporation of the solvent.

It is also possible to stretch the film in one or more directions after the evaporation of the first solvent from the film. This stretching of the film from which the solvent has been removed may optionally be carried out at a higher temperature than that at which the stretching during the evaporation of the solvent was effected, provided that this higher temperature is not so much higher than the melting temperature of the polyolefine that melt fracture occurs.

In the process according to the invention the surfaces of both sides (e.g. a first and a second surface) of the film consisting of the solution are brought into close contact with a second solvent before the film is cooled to a gel film through contact with the cooling agent in the cooling bath. Although the contact of only a portion of the surface of each of the two sides with the second solvent already causes the moisture vapour transmission rate to increase, it is preferable, for the purpose of simplifying the process and obtaining a film with uniform properties, to bring the entire surfaces of both sides into close contact with the second solvent.

The close contact can be effected for example by spraying both sides of the film with the second solvent in the form of a vapour, a spray or droplets. Excellent results are obtained when a layer of the second solvent floats on the actual cooling agent in the cooling bath. When the film is introduced into the cooling bath it then first passes the layer of second solvent, with which it comes into close contact before coming into contact with the cooling agent beneath the solvent layer. Preferably, use is therefore made of this embodiment of the process according to the invention, for example under the conditions described below.

The density of the second solvent must in this case be smaller than that of the cooling agent. When water is used as a cooling agent this requirement is met by most polyolefine solvents.

The thickness of the layer of second solvent is to be chosen such that the solvent forms a closed layer and does not form globules on the surface of the cooling agent. This requirement is usually met if the layer of solvent is a few, for example 2, millimeters thick. For a person skilled in the art it is easy to experimentally determine the minimum thickness for obtaining a closed layer for any combination of cooling agent and second solvent. In order to prevent the risk of the layer breaking a layer thickness of at least 3 mm is preferred. Preferably, an evaporable solvent is used as second solvent too. This presents the advantage that it can be removed together with the first solvent already in the film in one and the same evaporation step. For an economic process the second solvent is most preferably the same as the first solvent.

The layer of second solvent is applied to the surface of the cooling bath in such a manner that both sides of the film are brought into close contact with this solvent when the film is introduced into the cooling bath. For example, it is possible to place sufficient screen walls at suitable places in the cooling bath, which screen walls project below and above the surface of the cooling agent and are set perpendicular to this surface. In this way it is also possible to considerably limit the area of the surface of the cooling bath on which there is a layer of solvent. A suitable geometry of such screen walls can also ensure that only a part of the surface of each of the two sides of the film comes into contact with the second solvent.

The invention is illustrated with the aid of the following examples without, however, being limited hereto. The quantities mentioned in the examples were determined in the following manners.

The tensile strength, the elongation at break and the modulus of elasticity were determined according to ASTM standard D882-83, using a specimen with a width of 5 mm and a length between the jaws of 25 mm. The crosshead speed was 25 mm/min.

The moisture vapour transmission rate was determined as the Moisture Vapour Transmission Rate (MVTR), in g/24h.m$^2$, according to ASTM standard E96-66BW, at a temperature of 23° C., 50% relative humidity and an air flow rate of 2 m/s. The permeability to air was determined in s/50 ml as the Gurley number according to ASTM standard D726-58, using a measuring area of 6.45 cm$^2$ (1 square inch) and a weight of 567 grams. The thickness of the films was measured with the aid of a Millitron Feinprüf meter, whose sensor had a rounding off radius of 12 mm.

The density of the film was determined by weighing a piece of film with a known volume.

The porosity was determined from the measured density $\rho$ and the density of the polyolefin bulk material $\rho_0$ as:

$$\text{porosity} = \frac{\rho_0 - \rho}{\rho_0} \times 100\%$$

The maximum pore size was determined with the aid of a Coulter porometer.

The Intrinsic Viscosity was determined in Decalin at 135° C. The waterproofness of the film was determined as the height in meters of the water column that could be placed on the film before water started to drip through the film under the influence of the weight of the water column. The loaded surface area measured 17.3 cm$^2$. The film was supported by a metal grid.

EXAMPLE I

A 20 wt. % solution of polyethylene with an Intrinsic Viscosity of 15.5 dl/g, which corresponds to a weight average molecular weight of 2.2×10$^6$ g/mole, in Decalin was extruded at a temperature of 180° C. The extruder head was fitted with a die with a gap of 400 mm×1 mm. The extruded film was introduced into a cooling bath whose liquid surface was about 1 mm below the outlet of the die gap. The cooling bath contained water of 20° C., onto which a 3–4-mm thick layer of Decalin had been applied so that both sides of the film came into contact with the Decalin as the film was introduced into the cooling bath. The solvent was removed from the gel film thus obtained in an oven at a temperature of 70° C., in which the length and width of the film were kept constant. The film from which solvent had been removed was simultaneously stretched in machine (M) and transverse (T) direction, at a temperature of 120° C.

Table 1 shows the properties of the stretched film at different stretch ratios.

TABLE 1

| Stretch ratio [M × T] | 6 × 6 | 8 × 8 |
|---|---|---|
| Thickness (μm) | 55 | 38 |
| Porosity (%) | 84 | 86 |
| Max. pore size (μm) | 0.14 | 0.19 |
| MVTR (g/24 h · m$^2$) | 11200 | 14640 |
| Gurley number (s/50 ml) | 1.5 | 2.1 |
| Tensile strength [M/T] (MPa) | 27/26 | 27/27 |
| Modulus [M/T] (MPa) | 330/230 | 330/260 |
| Elongation at break [M/T] (%) | 18/29 | 15/18 |

EXAMPLE II

The procedure described in Example I was repeated, with the difference that only the length of the film was kept constant during the evaporation of the solvent, in this case at 30° C. Next, the film was stretched at a temperature of 120° C., first in machine direction and then in transverse direction. No shrinkage was allowed in the direction in which the film was not being stretched.

Table 2 shows the properties of the stretched film at different stretch ratios.

TABLE 2

| Stretch ratio [M × T] | 5 × 10 | 5 × 9 | 5 × 7 |
|---|---|---|---|
| Thickness (μm) | 44 | 57 | 81 |
| Porosity (%) | 84 | 84 | 84 |
| Max. pore size (μm) | 2.7 | 3.1 | 4.3 |
| MVTR (g/24 h · m$^2$) | 13190 | 12800 | 12250 |
| Gurley number (s/50 ml) | 3.5 | 1.6 | 2.4 |
| Watertightness (mH$_2$O) | 15 | 7 | 10 |
| Tensile strength [M/T] (MPa) | 13/28 | 7/25 | 7/22 |
| Modulus [M/T] | 170/290 | 90/280 | 80/230 |
| Elongation at break [M/T] (%) | 25/14 | 34/13 | 33/13 |

EXAMPLE III

The procedure described in example II was repeated, with the difference that use was made of a 30 wt. % solution in Decalin of high-density polyethylene with an Intrinsic Viscosity of 4 dl/g, which corresponds to a weight average molecular weight of about 360,000. Table 3 shows the properties of the stretched film at different stretch ratios.

TABLE 3

| Stretch ratio [M × T] | 5 × 5 | 7 × 7 |
|---|---|---|
| Thickness (μm) | 115 | 48 |
| Porosity (%) | 85 | 81 |
| MVTR (g/24 h · m$^2$) | 11730 | 13200 |

TABLE 3-continued

| Gurley number (s/50 ml) | 6.0 | 4.8 |
| --- | --- | --- |

EXAMPLE IV

The procedure described in example III was repeated, with the difference that the layer of Decalin on the cooling bath was replaced by a 5-mm thick layer of xylene. Table 4 shows the properties of the stretched film at different stretch ratios.

TABLE 4

| Stretch ratio [M × T] | 6 × 5 | 7 × 7 |
| --- | --- | --- |
| Thickness (μm) | 92 | 50 |
| Porosity (%) | 81 | 84 |
| MVTR (g/24 h · m²) | 12630 | 13670 |
| Gurley number (s/50 ml) | 4.9 | 3.2 |

COMPARATIVE EXAMPLE A

Example II was repeated, with the difference that no layer of solvent was applied to the cooling bath so that both sides of the extruded film came into direct contact with the water. The solvent was removed from the film, which was then stretched successively in machine and transverse direction. Table 5 shows the properties of the film.

TABLE 5

| Stretch ratio [M × T] | 4.5 × 8 | 5 × 9 |
| --- | --- | --- |
| Thickness (μm) | 69 | 48 |
| Porosity (%) | 76 | 80 |
| MVTR (g/24 h · m²) | 7250 | 7440 |
| Gurley number (s/50 ml) | 171.2 | 173.5 |

Both the moisture vapour transmission rate and the permeability to air of the films obtained in this manner are lower than those of the film according to the invention.

COMPARATIVE EXAMPLE B

Example II was repeated, with the difference that a layer of Decalin was now applied to the cooling bath, in such a manner that only one side of the extruded film came into close contact with the Decalin as the film was introduced into the cooling bath. The solvent was removed from the film, which was then successively stretched in machine and transverse direction. Table 6 shows the properties of the film.

TABLE 6

| Stretch ratio (M × T) | 7 × 8 | 6 × 9 | 5.5 × 5.5 |
| --- | --- | --- | --- |
| Thickness (μm) | 27 | 37 | 62 |
| Porosity (%) | 80 | 84 | 83 |
| Max. pore size (μm) | 0.13 | 0.14 | 0.21 |
| MVTR (g/24 h · m²) | 12300 | 13990 | 13090 |
| Gurley number (s/50 ml) | 47.5 | 25.8 | 24.2 |
| Watertightness (mH₂O) | >50 | >50 | >50 |
| Tensile strength [M/T] (MPa) | 46/44 | 35/39 | 29/19 |
| Modulus [M/T] (MPa) | 570/510 | 400/430 | 290/250 |
| Elongation at break [M/T] (%) | 16/22 | 19/22 | 18/27 |

Although the water vapour transmission ratio is very high, the permeability to air of the film thus obtained is greater than that of the film according to the invention.

EXAMPLE V

Example II was repeated with the difference that the thickness of the layer of solvent was varied. Table 7 shows the properties of the films.

TABLE 7

| Thickness decalin layer (mm) | 50 | 80 |
| --- | --- | --- |
| Stretch ratio [M × T] | 5.5 × 5.5 | 5.5 × 5.5 |
| Thickness (μm) | 61 | 58 |
| Porosity (%) | 80 | 81 |
| Pore size (μm) | 3–4 | 3–4 |
| MVTR (g/24 h · m²) | 12500 | 14500 |
| Gurley number (s/50 ml) | 2.4 | 0.8 |

We claim:

1. A process for the production of microporous film from a polyolefin which comprises forming a solution of the polyolefin in an evaporable first solvent, forming a polyolefin film having a first and second surface from said solution, contacting at least a portion of each said surface of said film with a second solvent, passing said film through a cooling bath wherein the cooling bath contains a cooling agent, removing the solvent from said film at a temperature below the dissolution temperature of said film, and stretching said film in at least one direction in the plane of said film.

2. A process according to claim 1, wherein said polyolefin is polyethylene.

3. A process according to claim 1, wherein a polyethylene has a weight average molecular weight of at least $10^6$ grams/mole.

4. A process according to claim 1, wherein the second solvent is applied to at least a portion of the surface of the cooling bath, and wherein contacting with said second solvent is achieved by introducing said film into the cooling bath through the layer of second solvent.

5. A process according to claim 4, wherein said second solvent layer is at least 3 mm thick.

6. A process according to claim 1, wherein the second solvent is an evaporable solvent.

7. A process according to claim 1, wherein the first and the second solvent are the same.

\* \* \* \* \*